Dec. 24, 1968 E. H. STARK 3,417,575

METHOD OF AND MEANS FOR COOLING SEMICONDUCTOR DEVICES

Filed April 10, 1967 2 Sheets-Sheet 1

INVENTOR.
ERNEST H. STARK
BY
A. Richard Koch
AGENT

METHOD OF AND MEANS FOR COOLING SEMICONDUCTOR DEVICES

Filed April 10, 1967 2 Sheets-Sheet 2

INVENTOR.
ERNEST H. STARK
BY
A. Richard Koch
AGENT 3,417,575

METHOD OF AND MEANS FOR COOLING SEMICONDUCTOR DEVICES

Ernest H. Stark, Rockford, Ill., assignor to Barber-Colman Company, Rockford, Ill., a corporation of Illinois Filed Apr. 10, 1967, Ser. No. 629,684
9 Claims. (Cl. 62—119)

ABSTRACT OF THE DISCLOSURE

An electrically insulating volatile fluid extracts heat from a heat sink for a current controlling semiconductor device by evaporation and releases it to a cooling medium by condensation in a condenser insulated from the heat sink.

*Background of the invention*

This invention concerns the removal of heat from an electrically insulated semiconductor control device by fluid circulation.

Some systems employed in air conditioning involve electric heating elements mounted in the air supply ducts to heat or reheat the air delivered to a room or other controlled space, the current through the heating elements being controlled in accordance with the heat requirements of the room. The current through the heating coils is frequently controlled by solid state current controllers such as silicon controlled rectifiers, Triacs, and the like, the current rating of which is reduced as their temperature increases. Failure of such devices is then likely to occur. It is therefore desirable to maintain such devices at low enough temperatures to assure reliable operation. This is accomplished by locating them where the ambient temperature is relatively low and by conducting away the heat internally generated, usually by means of heat sinks. Heat sinks must be sufficiently massive adjacent the heat source to rapidly conduct heat away from the source to a heat dissipating surface, from which the heat is extracted by a cooling medium such as air to water. The amount of heat dissipated depends upon the heat transfer properties of the interface, the temperature difference, the contact area and the rate of flow of the cooling medium over the heat dissipating surface. In solid heat sinks the temperature difference decreases from a maximum at the heat source to a minimum at a remote point, so that the amount of heat dissipated per unit area is reduced as the distance from the source increases and the overall efficiency is rather low. In order to raise the efficiency of heat dissipation, volatile fluids have been employed to remove heat from the heat source by evaporation in order to distribute such heat, without substantial loss, fairly evenly throughout a condenser and to dissipate the heat by condensation at substantially constant temperature to the walls of the condenser, from which it is removed by a cooling medium as previously noted.

Power semiconductor devices such as SCR's, Triacs and transistors are generally stud mounted on the heat sink with the stud acting as one of the power terminals, usually the anode in an SCR, the anode two in a Triac, and the collector in a transistor. The heat sink, and cooler if any, is therefore live electrically unless an electrical insulator is interposed between the heat generating device and the heat sink. Since ordinary electrical insulators are heat insulators as well, the efficiency of the cooling device is impaired. Conversely ordinary heat conductors are electrical conductors as well. It is therefore difficult to conduct heat away from such semiconductors efficiently while insulating them electrically. Transistors and SCR's are unidirectionally conducting devices so that two of them must be connected in reverse parallel in order to provide full wave control for an AC circuit. In such a control the two anodes or collectors are of opposite polarity at any time when voltage is present and, having different electrical potentials, cannot be connected together without creating a short circuit. A similar situation arises when polyphase circuits are controlled by either unidirectional or bidirectional semiconductor devices. This has prevented the use of a single cooling device for all of the semiconductor devices involved in controlling such circuits.

*Summary of the invention*

The apparatus disclosed herein is adapted for use in an electric heating system employing electric heating elements mounted in air supply ducts to temper the air delivered to a room or other controlled space. The heat generated by the semiconductor devices controlling the flow of electricity to the heating elements is dissipated to the air in the supply duct. In this way advantages is taken of the flow of relatively cool supply air through the duct to reduce the area of the heat dissipating surface or eliminate the need for a separate fan to create an air flow over the heat dissipating surface and so reduce the size and cost of the cooling means. The heat removed from the semiconductor devices is used to help to temper the air delivered to the room, so that the efficiency of the entire system is increased. By enclosing the components external to the duct, the likelihood of short circuits, electrical shocks, burns, fires and the like is practically eliminated.

In accordance with this invention the heat generating semiconductor devices are cooled efficiently by evaporation of a volatile fluid while being completely isolated electrically from the heat dissipating surface upon which the fluid is condensed. Furthermore several semiconductor devices having different potentials and polarities on their mounting surfaces can be cooled by a single means. The semiconductor devices can be mounted, removed and replaced without disturbing the structure or operation of the cooling device.

*Description of the preferred embodiment*

Figure 1:
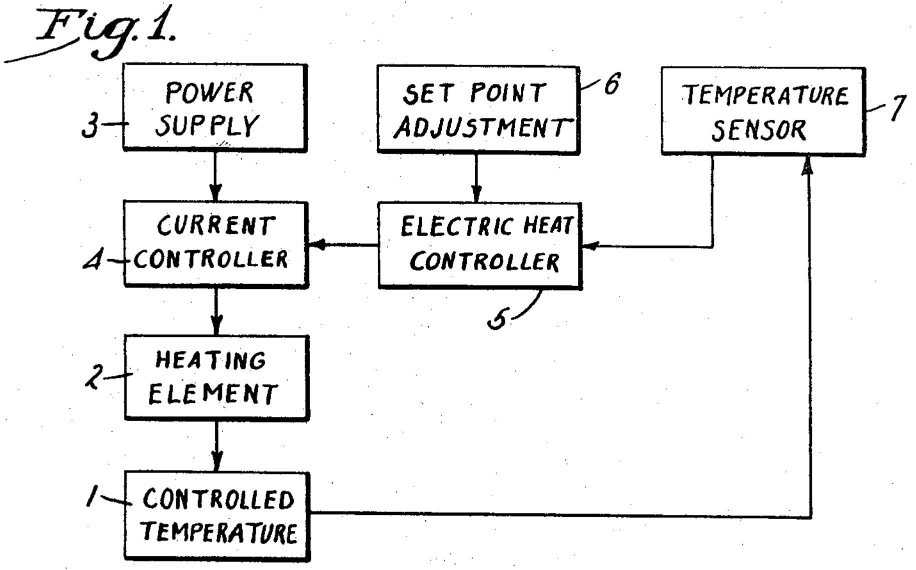
FIG. 1 is a block diagram of an electric heating system.

As shown in FIG. 1, a simple electric heating system may temper the controlled temperature 1 by means of electric heating elements 2, energized by current obtained from power supply 3 and controlled by current controller 4 in accordance with an input received from an electric heat controller 5 in response to a set point adjustment 6 and a temperature sensor 7 exposed to the controlled temperature 1.

Figure 2:
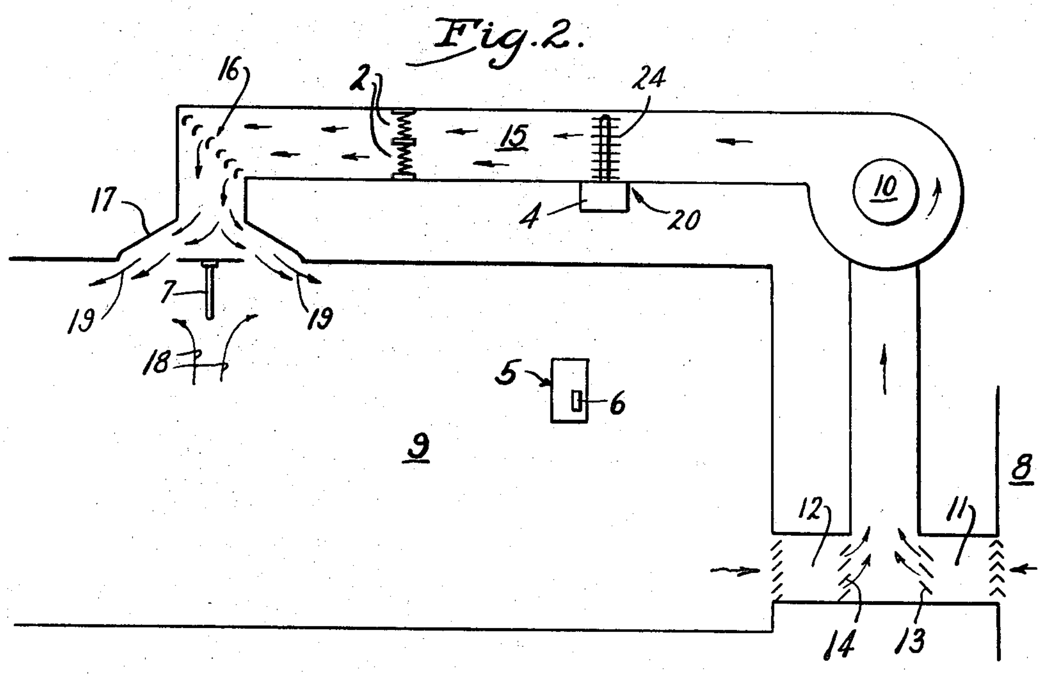
FIG. 2 is a sectional view of a typical electric heating system for a room to which tempered air is supplied through a duct.

FIG. 2 depicts a simple, rather typical, room air heating system in which air from outside 8 and return air from the room 9 is drawn by fan 10 through intakes 11 and 12 in proportions determined by the setting of the outside and return air dampers 13 and 14, respectively. The fan 10 blows this air through duct 15, over the electric heating element 2, through air turns 16 and diffuser 17 into room 9. The room air temperature sensor 7, which may be a thermistor, is mounted beneath the diffuser 17 in the path of aspirated air, defined by arrows 18, resulting from the centrifugal motion of the diffused air as shown by arrows 19. The electric heat controller 5 and set point adjustment 6 may be located at any convenient location as on the wall of the room 9. The current controller 4 is preferably located near the heating element 2 in order to reduce the length of line voltage wiring required. It is shown here as mounted upon the duct 15 upstream from heating element 2 for reasons to become apparent later.

Figures 3, 4:
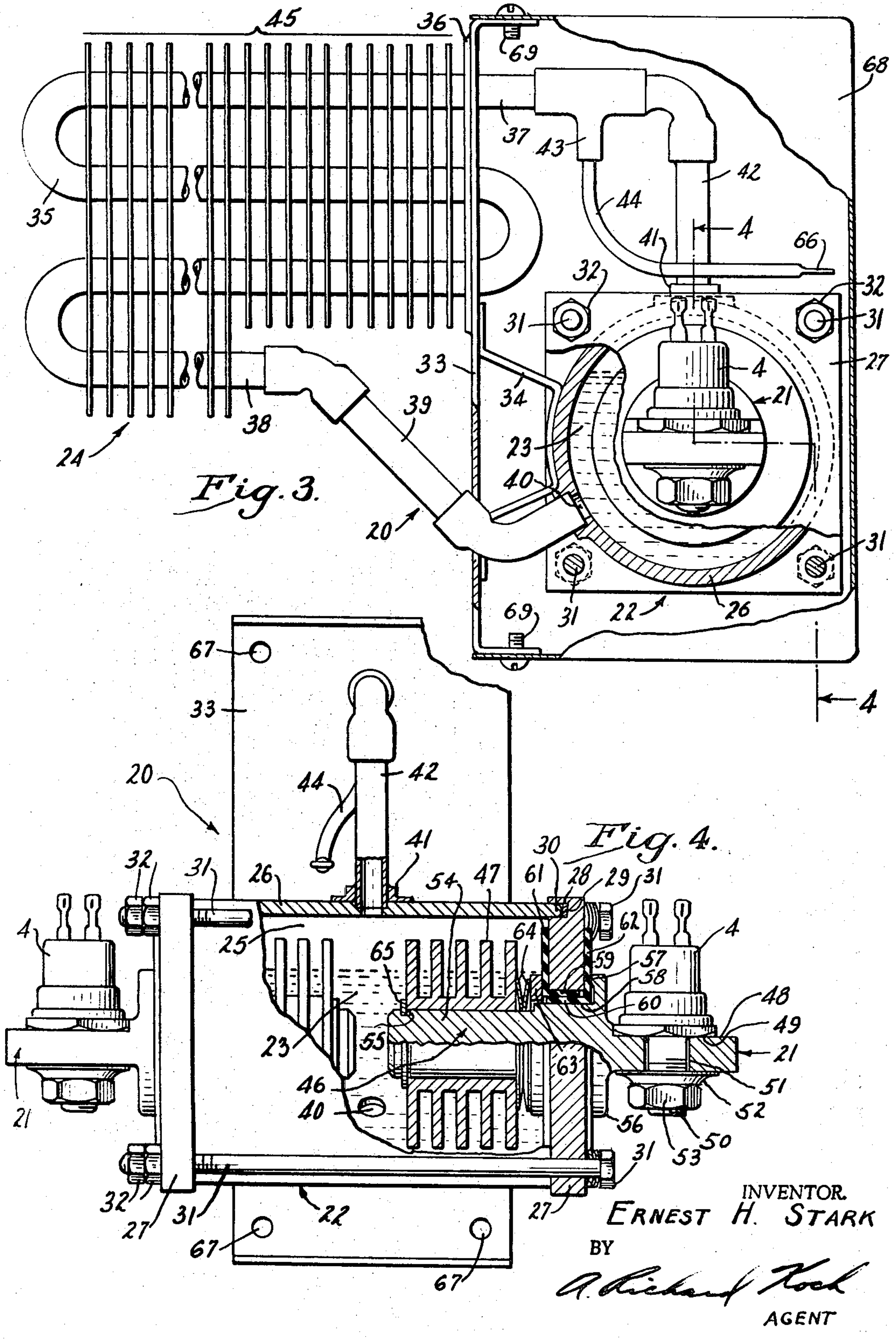
FIG. 3 is a side elevation, partially in section, of a cooling means for a semiconductor current controller.
FIG. 4 is a front elevation, partially in section substantially along line 4—4 in FIG. 3, of the cooling means. It primarily shows the construction of the evaporator and the connections thereto.

FIGS. 3 and 4 are different views of means 20 for cooling current controllers 4. As previously stated, when polyphase loads are being controlled or when unidirectional current controllers are used for full wave control of alternating current, a plurality of current controllers are required. In this embodiment of the invention two such controllers, which we will refer to as silicon controlled rectifiers or SCR's 4 are cooled by a single cooling means 20. The cooling means 20 comprises essentially a heat sink 21, upon which an SCR 4 is mounted; an exaporator 22, in which a supply of volatile fluid in liquid state 23 is always maintained; and a condenser 24, in which the volatile fluid in gaseous state 25 is condensed.

The evaporator 22 comprises a hollow cylinder made from a steel tube forming a wall 26 closed at each end by an aluminum end plate 27 having an annular groove 28 in one face to receive a sealing gasket 29 and the convex wall end 30 so that when the opposed end walls or plates 27 are drawn together, as by bolts 31 and nuts 32, the gaskets 29 are compressed between the convex ends 30 and the end plates 27 to form a gas tight seal therebetween. The evaporator 22 is attached to one face of a mounting plate 33 by means of a bracket 34 spot welded to both the wall 26 and mounting plate 33. The condenser 24 comprising a finned tube 35 of serpentine configuration attached to the other side of mounting plate 33 by means of a supporting plate 36 welded to both the finned tube 35 and the other face of mounting plate 33 such that the condenser 24 lies in a vertical plane when the evaporator 22 is horizontal and so that liquid in the tube 35 will flow by gravity from the upper end 37 to the lower end 38. The lower end 38 is connected by generally downwardly sloping brazed copper fittings or conduit 39 passing through mounting plate 33 to the evaporator 22 at inlet 40 near the bottom of cylinder wall 26. The upper end 37 passing through mounting plate 33 is connected to the uppermost part of evaporator 22 at outlet 41 by vertically rising brazed copper fittings or conduit 42, including a T connection 43 for a copper filler tube 44. The fins 45 on said finned tube 35 form a heat dissipating surface.

The heat sink 21 is made in two parts, a core 46 and a finned sleeve 47. The core 46 has a flat surface 48 on one end to provide an intimate heat conducting contact directly to the mounting surface 49 of the SCR 4, shown here as separably mounted by an integral stud 50 passing through a hole 51. A resilient washer 52 held in compression by a nut 53 threaded on stud 50 provides substantially constant pressure on the mounting surface. A cylindrical portion 54 on the other end of the core 46 has an annular groove 55 near the outer end and is separated from the flat surface 48 by a flange 56, having an annular bead 57 on the face adjacent the cylindrical portion 54. The cylindrical portion passes through a hole 58 in an end plate 27 and is separated therefrom by a pair of concentric Teflon (tetrafluoroethylene) cylindrical electrical insulators 59 and 60, each having a flange, 61 and 62 respectively, abutting the respective inner and outer faces of end plate 27. A stress relieving washer 63 and resilient washers 64 are placed between the flange 61 and the finned sleeve 47, which is pressed or shrunk onto the cylinder 54 so that the force exerted by the resilient washers 64 is transmitted through the stress relieving washer 63, flange 61, and end plate 27 to compress flange

62 between the end plate 27 and the bead 57 to form a gas tight seal between the end plate 27 and the heat sink 21. A retaining ring 65 in groove 55 is a safety precaution to prevent possible movement of the finned sleeve 47 on cylinder 54 from breaking the seal.

After the cooling means 20 has been assembled, the evaporator 22, condenser 24 and fittings 39 and 42, forming a gas tight container, are evacuated and filled through filler tube 44 with an electrically insulating volatile fluid, such as Freon 11, at a pressure assuring that the heat sink 21 inside the evaporator 22 is substantially completely covered with the fluid in the liquid state 23, while the remainder of the container is filled with the gaseous state 25. The filler tube 44 is then sealed at end 66 as by pinching it off.

Holes 67 are provided in the mounting plate 33 to assist in attaching the cooler 20 to the side of a duct 15 as shown in FIG. 2 with the condenser 24 within the duct and the remainder of the cooler 20, including the attached semiconductor current controller 4, outside the duct. The cooler 20 must be mounted on the side of the duct in the position shown in FIGS. 3 and 4 and described above. A cover 68, releasably fastened to the mounting plate 33 as by screws 69, encloses the evaporator 22, heat sinks 21, attached SCR's 4, fittings 39 and 42, and such parts of the condenser 24 which are outside the duct to prevent personnel from being burned or shocked by contact with hot or electrically live components, to prevent short circuits resulting from conducting materials bridging either the terminals of the current controller 4 or the heat sinks 21, and to prevent flammable materials coming into contact with hot components, while permitting ready access to the SCR's 4 when desired.

When in use heat generated in the SCR's 4 is conducted through the core 46 of heat sink 21 to the finned sleeve 47, where the volatile fluid in liquid state 23 absorbs the heat and vaporizes to gaseous state 25. The vaporization causes bubbles to form on the surface of the finned sleeve. These bubbles act as insulators and so must be removed as rapidly as possible. With the fins in a vertical plane, as shown and described, a bubble forming and breaking loose near the bottom of the fins carries along any bubbles in its upward path, removing them before they would break away by themselves. The vaporization of the fluid in the evaporator 22 creates a pressure therein causing some of the gaseous fluid 25 collected at the top of the evaporator to move through outlet 41 and fittings 42 into the condenser 24 at the upper end 37 of tube 35. In order to prevent condensation from occurring in the fittings 42, where liquid may block flow of the gaseous fluid 25, it may be necessary or desirable to leave a portion of the finned sleeve 47 exposed to the gaseous fluid 25 to provide superheat. As the gaseous fluid 25 flows through the tube 35, heat is extracted from it by the heat dissipating surfaces comprising the tube 35 and the fins 45 thereon, causing the gaseous fluid 25 to condense to the liquid state 23. This condensation causes a drop in pressure in the condenser 24 and pulls more gaseous fluid 25 from the evaporator 22. The resulting drops of liquid fluid 23 flow by gravity down the inside of the tube 35 and along the bottom thereof collecting more small drops as they move along to the lower end 38, where the collected liquid fluid 23 enters fittings 39 and returns through inlet 40 to the evaporator 22 below the liquid level. The relatively cool air in duct 15, flowing over the fins 45, extracts the heat therefrom.

When a plurality of semiconductor current controllers 4 at different potentials are cooled by a common means according to this invention, it is only necessary to prevent contact between the heat sinks 21, as shown in FIG. 4 by way of example.

Although a specific application has been cited, a definite apparatus described, and certain materials mentioned, it is obvious that equivalent applications, apparatus and materials could be employed. Therefore the invention disclosed herein is limited only by scope of the claims.

I claim:

1. A method for cooling a semiconductor electric current controlling device having an uninsulated mounting surface comprising the steps of mounting a condenser inside a duct for a cooling medium, separably mounting the semiconductor outside said duct directly upon a heat sink electrically insulated from the duct and from the condenser, exposing a portion of said heat sink remote from the semiconductor to a volatile electrically insulating liquid, conducting heat generated by said semiconductor from the mounting surface through the heat sink to said liquid, absorbing said heat by vaporizing the liquid into a condensable electrically insulating gas, passing said gas to the condenser, removing the heat from said gas to the condenser causing condensation of said gas to the liquid, and passing said cooling medium over the condenser to extract the heat therefrom.

2. A method for cooling a semiconductor electric current controlling device according to claim 1 in which the cooling medium is air.

3. Apparatus for cooling a current-controlling semiconductor device having an uninsulated mounting surface comprising in combination a gas tight container defining commuicating interior evaporation and condensation spaces with a wall of said condensation space forming an exterior heat dissipating surface, a heat sink having a first portion disposed in said evaporation space and a second portion disposed exteriorly of said container, means including an insulator mounting said heat sink in gas tight and electrically insulated relation to said container, an electrically insulating fluid disposed within and substantially filling said container, said fluid in volatile liquid state substantially covering said first portion of the heat sink to be heated by the latter, and means on said second portion for separable attachment of said semiconductor device in intimate heat-transferring and electrically-connecting engagement therewith.

4. Apparatus for cooling a current-controlling semiconductor device according to claim 3 having a plurality of heat sinks, said insulator and the fluid electrically isolating said heat sinks from each other as well as from the container.

5. Apparatus for cooling a current-controlling semiconductor device according to claim 3 in which said evaporation and condensation spaces are separated, the communication between said spaces comprising an upper conduit for the fluid in gaseous state passing from said evaporation space to the condensation space and a lower conduit for the fluid in liquid state returning from said condensation space to the evaporation space.

6. Apparatus for cooling a current-controlling semiconductor device according to claim 5 having mounting means for said apparatus generally separating the condensation space from said evaporation space, said conduits passing through the mounting means.

7. Apparatus for cooling a current-controlling semiconductor device according to claim 3 having a removable cover enclosing all electrically live external portions of said heat sink and any said semiconductor device attached thereto to prevent exposure of the electrically live portions.

8. Apparatus for cooling a current-controlling semiconductor device according to claim 3 having a removable cover enclosing the entire apparatus except for the heat dissipating surface.

9. Apparatus for cooling a current-controlling semiconductor device according to claim 3 in which said first portion of the heat sink is finned.

References Cited

UNITED STATES PATENTS

| | | | |
|---|---|---|---|
| 2,947,150 | 8/1960 | Roeder | 62—3 |
| 2,958,021 | 10/1960 | Cornelison | 62—119 X |
| 2,932,953 | 4/1960 | Becket | 62—3 |
| 3,035,419 | 5/1962 | Wigert | 62—119 |
| 3,112,890 | 12/1963 | Snelling | 62—119 |
| 3,143,592 | 8/1964 | August | 174—15 |
| 3,194,024 | 7/1965 | Bassett | 62—3 |

WILLIAM J. WYE, *Primary Examiner.*

U.S. Cl. X.R.

62—259; 174—15